US011943624B2

(12) United States Patent
Padova et al.

(10) Patent No.: US 11,943,624 B2
(45) Date of Patent: *Mar. 26, 2024

(54) ELECTRONIC SUBSCRIBER IDENTITY MODULE TRANSFER ELIGIBILITY CHECKING

(71) Applicant: Apple Inc., Cupertino, CA (US)

(72) Inventors: Jean-Marc Padova, San Francisco, CA (US); Xiangying Yang, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/934,885

(22) Filed: Sep. 23, 2022

(65) Prior Publication Data

US 2023/0013030 A1 Jan. 19, 2023

Related U.S. Application Data

(63) Continuation of application No. 17/147,410, filed on Jan. 12, 2021.

(60) Provisional application No. 62/960,598, filed on Jan. 13, 2020.

(51) Int. Cl.
*H04M 1/66* (2006.01)
*H04W 8/20* (2009.01)
*H04W 12/069* (2021.01)
*H04W 12/72* (2021.01)
*H04W 88/02* (2009.01)

(52) U.S. Cl.
CPC ............ *H04W 12/72* (2021.01); *H04W 8/20* (2013.01); *H04W 12/069* (2021.01); *H04W 88/02* (2013.01)

(58) Field of Classification Search
CPC ...... H04W 8/20; H04W 12/069; H04W 12/06
See application file for complete search history.

(56) References Cited

U.S. PATENT DOCUMENTS

| 10,764,746 | B1* | 9/2020 | Dreiling | H04W 8/26 |
| 11,146,948 | B1* | 10/2021 | Uehling | H04W 12/30 |
| 2012/0108295 | A1* | 5/2012 | Schell | H04W 4/60 235/375 |
| 2014/0143826 | A1* | 5/2014 | Sharp | G06F 21/604 726/1 |
| 2016/0150400 | A1* | 5/2016 | Cha | H04M 1/0266 455/418 |
| 2017/0244837 | A1* | 8/2017 | Kim | H04M 1/72409 |
| 2018/0014178 | A1* | 1/2018 | Baek | H04W 8/20 |
| 2019/0028881 | A1* | 1/2019 | Namiranian | H04W 8/183 |
| 2019/0075453 | A1* | 3/2019 | Yoon | H04W 8/245 |
| 2020/0008049 | A1* | 1/2020 | Namiranian | H04W 12/0433 |
| 2022/0086648 | A1* | 3/2022 | Laina Farell | H04W 12/40 |

* cited by examiner

*Primary Examiner* — Shantell L Heiber
(74) *Attorney, Agent, or Firm* — Dickinson Wright, RLLP

(57) ABSTRACT

Embodiments described herein relate to eligibility checking for transfer of one or more electronic subscriber identity modules (eSIMs) between two mobile wireless devices. Eligibility to transfer an eSIM to an eUICC of a target device can depend on whether the eUICC of the target device satisfies certain security requirements for the eSIMs to be transferred. The mobile wireless devices can obtain a transfer eligibility result based on communication with one or more network-based servers that can determine compatibility for eSIM transfer.

20 Claims, 11 Drawing Sheets

ELECTRONIC SUBSCRIBER IDENTITY MODULE TRANSFER ELIGIBILITY CHECKING

CROSS-REFERENCE TO RELATED APPLICATIONS

The present application is a continuation of U.S. application Ser. No. 17/147,410, filed Jan. 12, 2021, entitled "ELECTRONIC SUBSCRIBER IDENTITY MODULE TRANSFER ELIGIBILITY CHECKING," and issued Aug. 22, 2023 as U.S. Pat. No. 11,736,948, which claims the benefit of U.S. Provisional Application No. 62/960,598, entitled "ELECTRONIC SUBSCRIBER IDENTITY MODULE TRANSFER ELIGIBILITY CHECKING," filed Jan. 13, 2020, the contents of all of which are incorporated by reference herein in their entirety for all purposes.

FIELD

The described embodiments relate to wireless communications, including methods and apparatus to support eligibility checking for transfer of electronic SIMs (eSIMs) between wireless devices.

BACKGROUND

Newer generation, e.g., fourth generation (4G) and fifth generation (5G), cellular wireless networks that implement one or more 3$^{rd}$ Generation Partnership Project (3GPP) Long Term Evolution (LTE), LTE Advanced (LTE-A), and 5G standards are rapidly being developed and deployed by network operators worldwide. The newer cellular wireless networks provide a range of packet-based services. A user of a wireless device can access services offered by a wireless network service provider, also referred to as a mobile network operator (MNO), based on service subscriptions controlled by authentication credentials included in a profile, also referred to as a subscriber identity module (SIM), when included in a removable universal integrated circuit card (UICC), also referred to as a SIM card, or as an electronic SIM (eSIM), when included in an embedded UICC (eUICC) of the wireless device. With a removable UICC and an unlocked wireless device, a user can access different services by replacing the UICC/SIM combination, e.g., by transferring the SIM card from one wireless device to another wireless device. With a configurable eUICC, eSIMs can be downloaded to the eUICC for access to different wireless services. Wireless devices that accommodate multiple eSIMs on an eUICC provide for multiple subscriber identities to be used by the same wireless device to access different services, including services that can span different cellular wireless networks that use different cellular radio access technologies (RATs). A user can seek to transfer one or more eSIMs between wireless devices, such as when changing between different wireless devices or when purchasing and configuring a new wireless device to replace an older wireless device. There exists a need for mechanisms to check whether transfer of one or more eSIMs between wireless devices is permissible.

SUMMARY

This Application describes various embodiments that relate to wireless communications, including methods and apparatus to support eligibility checking for transfer of electronic SIMs (eSIMs) between wireless devices. Transfer of one or more eSIMs can occur between two devices that are within proximity of each other, e.g., where the devices can connect securely via a local connection, such as via a wireless personal area network (WPAN) connection, via a wireless local area network (WLAN) connection, via a peer-to-peer connection, or the like. Transfer of eSIMs can also occur via an online network-based service, such as via an MNO-managed service or via a third-party service, where the devices need not be in proximity to each other. Transfer of an eSIM from a source device to a target device can be preceded or accompanied by a determination of eligibility to transfer the eSIM. Eligibility to transfer an eSIM to an eUICC of a target device can depend on whether the eUICC of the target device satisfies certain security requirements for the eSIM to be transferred. The source device and/or the target device can obtain a transfer eligibility result based on one or more communications with one or more network-based servers. In some embodiments, information regarding the eUICC of the target device is provided to one or more network-based servers to determine whether the eUICC is eligible for transfer of one or more eSIMs. The information for the target device eUICC can be communicated: i) directly from the target device, ii) indirectly from the target device via the source device, iii) during an eSIM transfer procedure, and/or iv) in advance of an eSIM transfer procedure (e.g., a pre-qualification of eligibility of transfer of one or eSIMs to the target device eUICC). In some embodiments, eligibility checking can include one or more of: i) determination of an eUICC certification configuration (at the eUICC security level), ii) determination of a root of trust configuration for the eUICC, or iii) a digital level of approval (DLOA) security check. In some embodiments, an eSIM can be transferred to a target device eUICC when an eUICC trust configuration and a trust configuration of the eSIM to be transferred (and/or a trust configuration of the source eUICC) include at least one common root of trust. A trust configuration can be based on a white list of trusted entities and/or a black list of untrusted entities. An eUICC can include one or more certificates and one or more public keys extracted from signed and verified certificates provided by one or more trusted entities. In some embodiments, the source device and/or the target device provide information regarding the target device eUICC trust configuration to one or more network-based servers, such as a subscription manager data preparation (SM-DP+) server and/or a digital letter of approval (DLOA) server to determine eligibility for transfer of one or more eSIMs to the eUICC of the target device. In some embodiments, a transfer eligibility attestation result obtained from a network-based server includes an indication of a time period for which the transfer eligibility attestation result is valid. In some embodiments, the source device performs a validity check of the time period for transfer of the eSIM based on the transfer eligibility attestation result before allowing transfer of the SIM to the target device.

Other aspects and advantages of the invention will become apparent from the following detailed description taken in conjunction with the accompanying drawings which illustrate, by way of example, the principles of the described embodiments.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The disclosure will be readily understood by the following detailed description in conjunction with the accompanying drawings, wherein like reference numerals designate like structural elements.

DETAILED DESCRIPTION

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

These and other embodiments are discussed below with reference to FIGS. 1A through 9; however, those skilled in the art will readily appreciate that the detailed description given herein with respect to these figures is for explanatory purposes only and should not be construed as limiting.

Figure 1A:
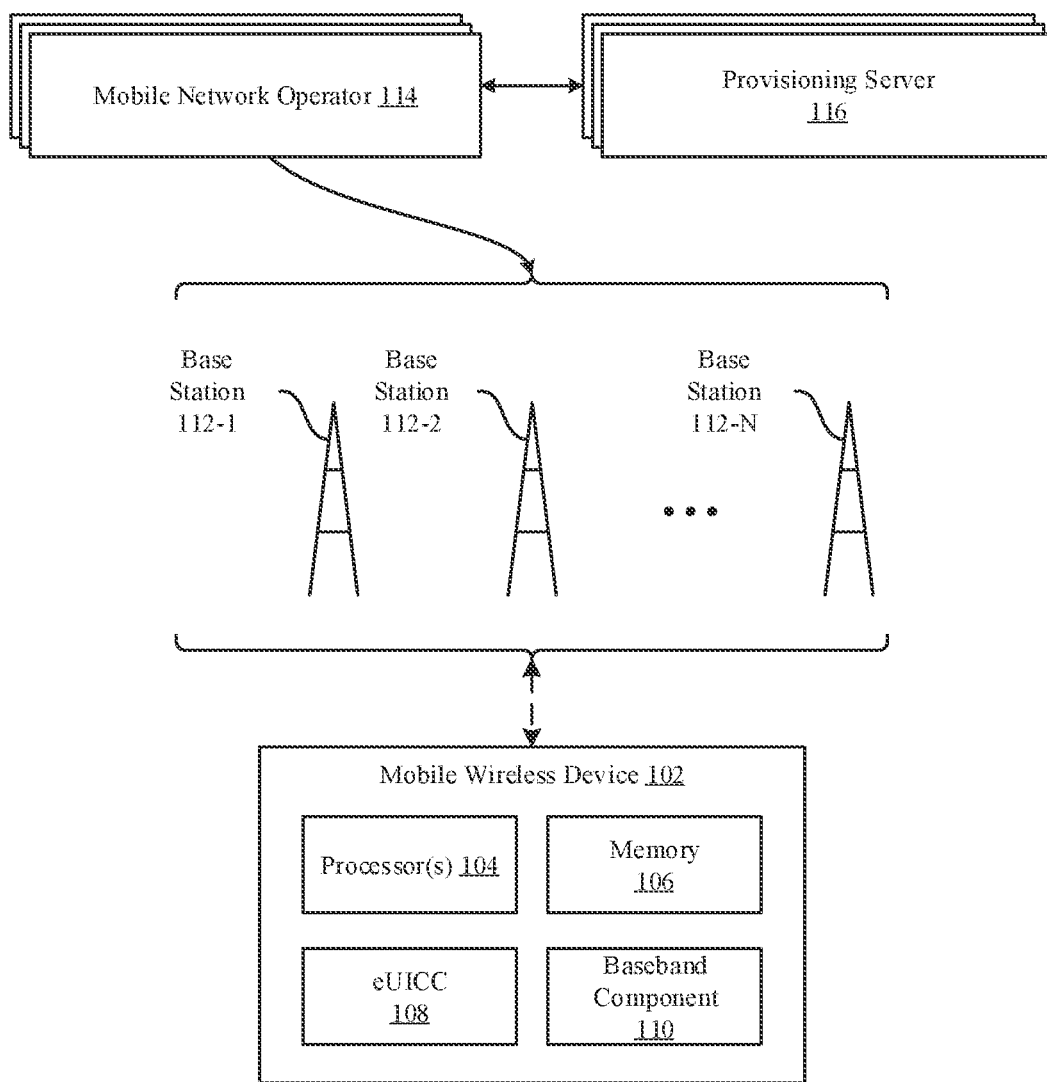
FIG. 1A illustrates a block diagram of different components of an exemplary system configured to implement remote provisioning of an eSIM, according to some embodiments.

FIG. 1A illustrates a block diagram of different components of a system 100 that includes i) a mobile wireless device 102, which can also be referred to as a wireless device, a mobile wireless device, a mobile device, a user equipment (UE), a device, and the like, ii) a group of base stations 112-1 to 112-N that are managed by different Mobile Network Operators (MNOs) 114, and iii) a set of provisioning servers 116 that are in communication with the MNOs 114. The mobile wireless device 102 can represent a mobile computing device (e.g., an iPhone® or an iPad® by Apple®), the base stations 112-1 to 112-N can represent cellular wireless network entities including evolved NodeBs (eNodeBs or eNBs) and/or next generation NodeBs (gNodeBs or gNBs) that are configured to communicate with the mobile wireless device 102, and the MNOs 114 can represent different wireless service providers that provide specific services (e.g., voice and data) to which the mobile wireless device 102 can subscribe. The mobile wireless device 102 can include processing circuitry, which can include one or more processors 104 and a memory 106, an embedded Universal Integrated Circuit Card (eUICC) 108, and a baseband component 110. In some embodiments, the mobile wireless device 102 includes one or more physical UICCs, also referred to as Subscriber Identity Module (SIM) cards (not shown), in addition to the eUICC 108. The components of the mobile wireless device 102 work together to enable the mobile wireless device 102 to provide useful features to a user of the mobile wireless device 102, such as cellular wireless network access, non-cellular wireless network access, localized computing, location-based services, and Internet connectivity. The eUICC 108 can be configured to store multiple electronic SIMs (eSIMs) for accessing services offered by one or more different MNOs 114 via communication through base stations 112-1 to 112-N. To be able to access services provided by the MNOs, an eSIM can be provisioned to the eUICC 108 of the mobile wireless device 102. In some embodiments, the eUICC 108 obtains one or more eSIMs (or updates for one or more eSIMs) from one or more associated provisioning servers 116. It is noted that provisioning servers 116 can be maintained by a manufacturer of the mobile wireless device 102, the MNOs 114, third party entities, and the like. Communication of eSIM data between a provisioning server 116 and the eUICC 108 (or between the provisioning server 116 and processing circuitry of the mobile wireless device 102 external to the eUICC 108, e.g., the processor 104) can use a secure communication channel, and the provisioning server 116 can seek to ensure that the eUICC 108 of the mobile wireless device 102 is compatible with an eSIM to be downloaded to the mobile wireless device 102.

Figure 1B:
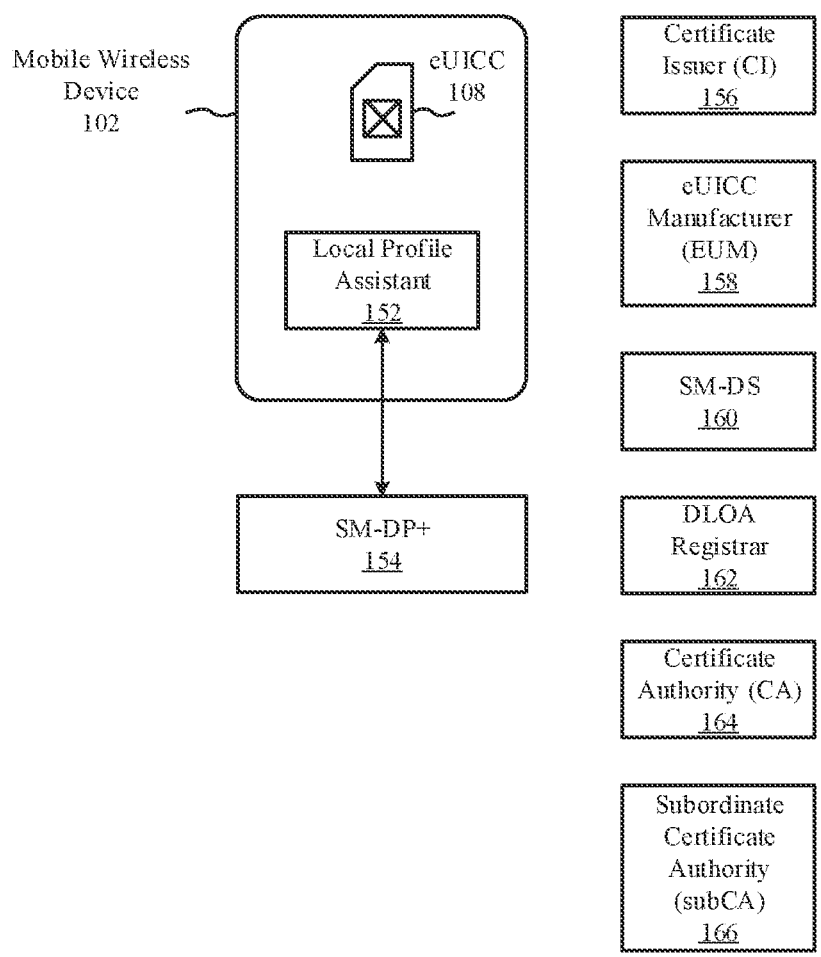
FIG. 1B illustrates a set of entities that can provide and/or verify information to determine eligibility to transfer an eSIM, according to some embodiments.

FIG. 1B illustrates a diagram 150 of a set of entities that can provide and/or verify information to determine eligibility to transfer an eSIM from a source device, e.g., mobile wireless device 102, to a target device, e.g., another mobile wireless device 102. A mobile wireless device 102 can include software, e.g., a local profile assistant (LPA) 152, which can be resident on a processor external to an eUICC 108 of the mobile wireless device 102 (or in some embodiments be included in the eUICC 108), where the LPA 152 provides an interface for communication with one or more network-based servers for management of eSIMs of the eUICC 108. The LPA 152 can assist with communication with a subscription manager data preparation (SM-DP+) server 154 that can provide initial downloads of one or more eSIMs to an eUICC 108 and/or provide updates for one or more eSIMs on the eUICC 108 of the mobile wireless device 102. The SM-DP+ server 154 can also provide eligibility checking and attestation for transfer of an eSIM between mobile wireless devices 102. The eUICC 108 of the mobile wireless device 102 can store one or more certificates (and associated public keys) from one or more network entities. The certificates (and the public keys) can be used for authentication and verification of the validity of messages and senders of messages to the mobile wireless device 102. Network entities involved in generating and communicating certificates, as well as authentication, verification, and/or attestation, can include a certificate issuer (CI) 156, an eUICC manufacturer (EUM) 158, the SM-DP+ 154, a subscription manager discovery server (SM-DS) 160, which can work in conjunction with the SM-DP+ 154, a digital letter of approval (DLOA) registrar 162, a certificate authority (CA) 164, and/or a subordinate CA (subCA) 166.

Figure 1C:
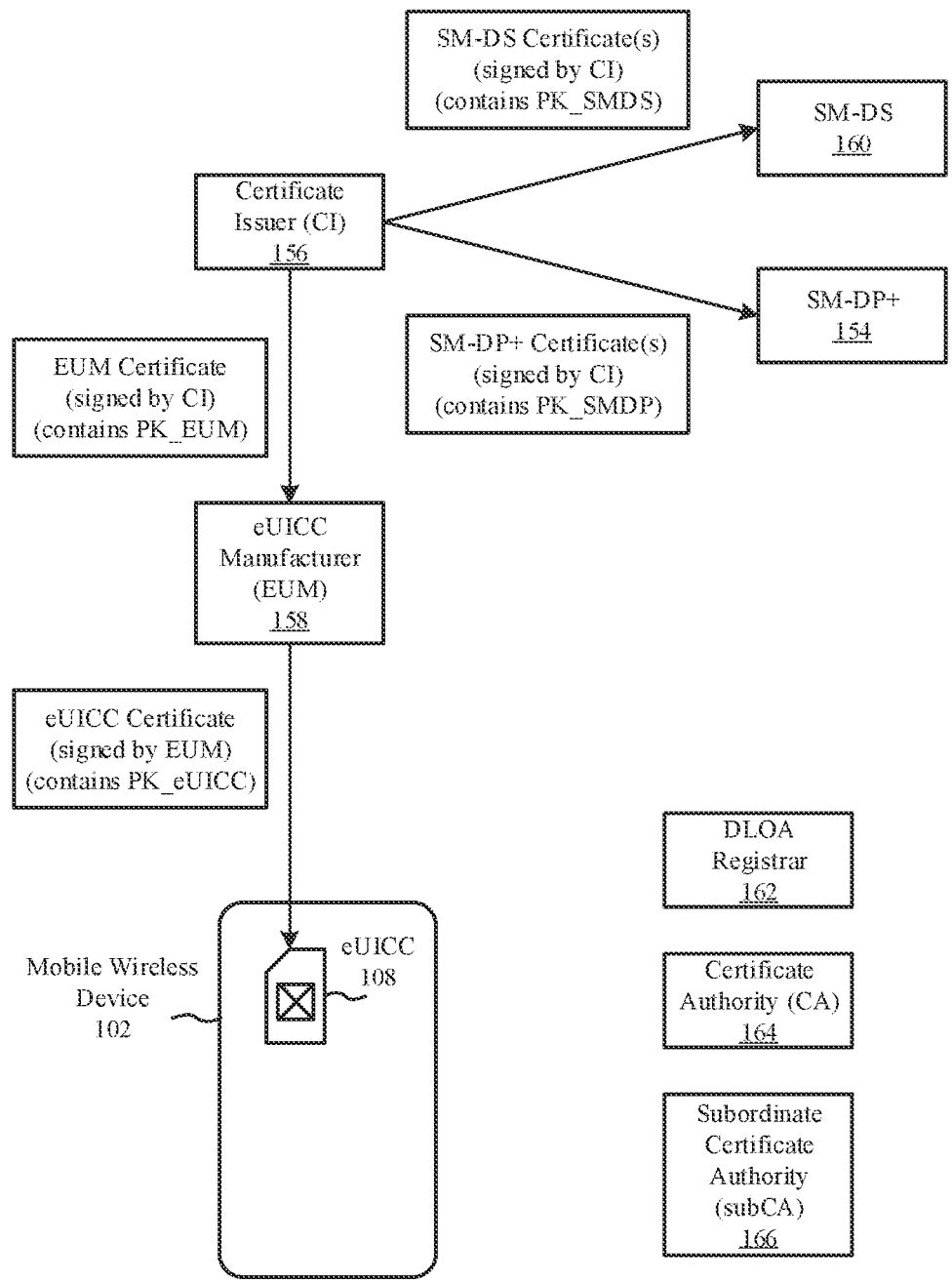
FIG. 1C illustrates an exemplary chain of certificates provided for authentication by entities of an exemplary system, according to some embodiments.

FIG. 1C illustrates a diagram 170 of an exemplary chain of certificates provided for authentication and verification by entities of an exemplary system. The certificate issuer (CI) 156 provides certificates, signed by the CI, to the eUICC manufacturer (EUM) 158, the SM-DP+ 154, and the SM-DS 160. Each certificate includes public keys for use by the respective entities that receive the certificate. The EUM 158 provides a certificate to the eUICC 108 of the mobile device, e.g., during manufacture or configuration of the eUICC 108, where the certificate is signed by the EUM 158 and contains a public key for the eUICC 108. The entities can each include secret keys associated with their respective public keys for use in cryptographic security protocols by the entities.

Figure 2:
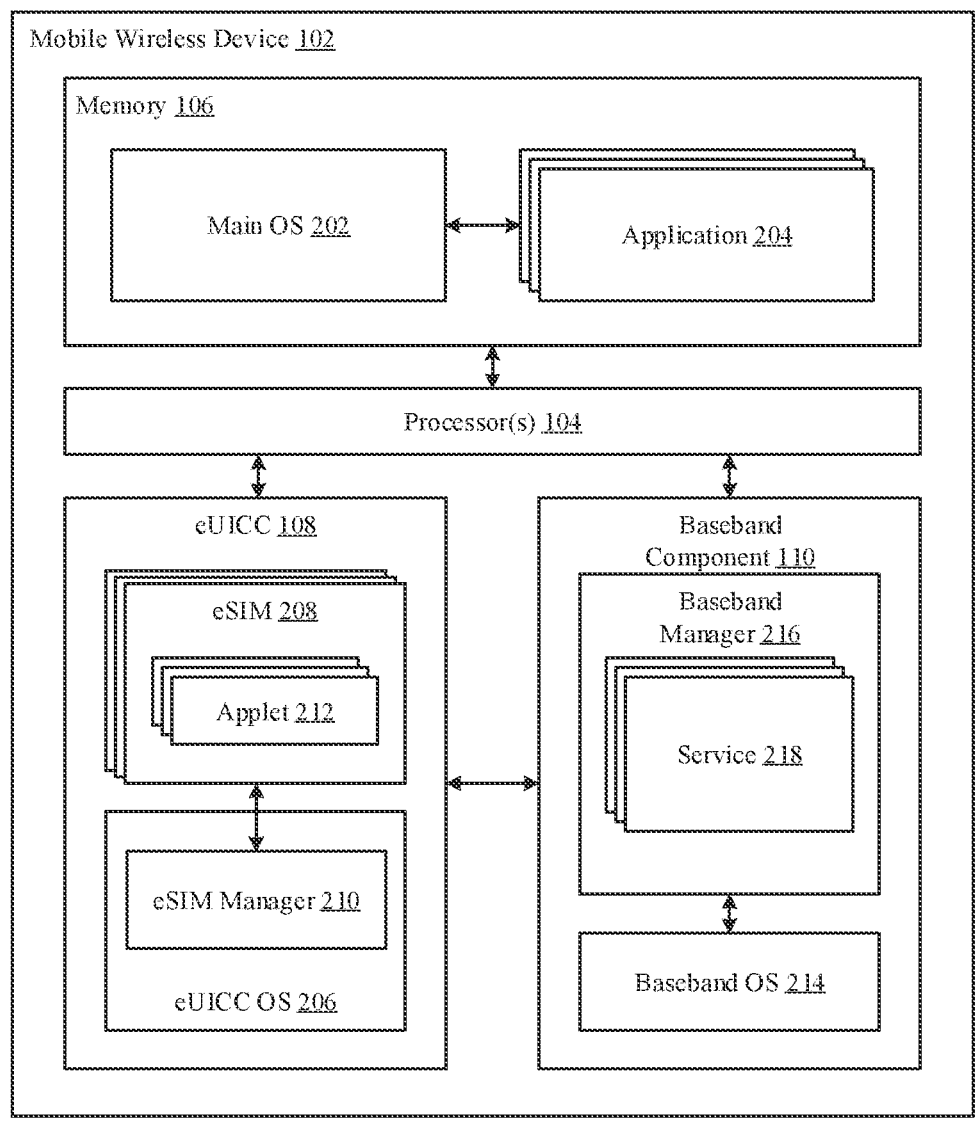
FIG. 2 illustrates a block diagram of a more detailed view of exemplary components of the system of FIG. 1A, according to some embodiments.

FIG. 2 illustrates a block diagram 200 of a more detailed view of exemplary components of the system 100 of FIG. 1A. The one or more processors 104, in conjunction with the memory 106, can implement a main operating system (OS) 202 that is configured to execute applications 204 (e.g., native OS applications and user applications). In some embodiments, the main OS 202 can include all or a portion of the LPA 152 of the mobile wireless device 102 for assisting with communication between the eUICC 108 and one or more network-based servers for management of eSIMs 208 of the eUICC 108. The eUICC 108 can be configured to implement an eUICC OS 206 that is configured to manage the hardware resources of the eUICC 108 (e.g., a processor and a memory embedded in the eUICC 108). The eUICC OS 206 can also be configured to manage eSIMs 208 that are stored by the eUICC 108, e.g., by enabling, disabling, modifying, or otherwise performing management of the eSIMs 208 within the eUICC 108 and providing the baseband component 110 with access to the eSIMs 208 to provide access to wireless services for the mobile wireless device 102. The eUICC OS 206 can include an eSIM manager 210, which can perform management functions for various eSIMs 208. In some embodiments, the eUICC OS 206 can include all or a portion of the LPA 152 of the mobile wireless device 102 for assisting with communication between the eUICC 108 and one or more network-based servers for management of eSIMs 208 of the eUICC 108. Each eSIM 208 can include a number of applets 212 that define the manner in which the eSIM 208 operates. For example, one or more of the applets 212, when implemented by the baseband component 110 and the eUICC 108, can be configured to enable the mobile wireless device 102 to communicate with an MNO 114 and provide useful features (e.g., phone calls and internet) to a user of the mobile wireless device 102.

A baseband component 110 of the mobile wireless device 102 can include a baseband OS 214 that is configured to manage hardware resources of the baseband component 110 (e.g., a processor, a memory, different radio components, etc.). According to some embodiments, the baseband component 110 can implement a baseband manager 216 that is configured to interface with the eUICC 108 to establish a secure channel with a provisioning server 116 and obtaining information (such as eSIM data) from the provisioning server 116 for purposes of managing eSIMs 208. The baseband manager 216 can be configured to implement services 218, which represents a collection of software modules that are instantiated by way of the various applets 212 of enabled eSIMs 208 that are included in the eUICC 108. For example, services 218 can be configured to manage different connections between the mobile wireless device 102 and MNOs 114 according to the different eSIMs 208 that are enabled within the eUICC 108.

Figure 3:
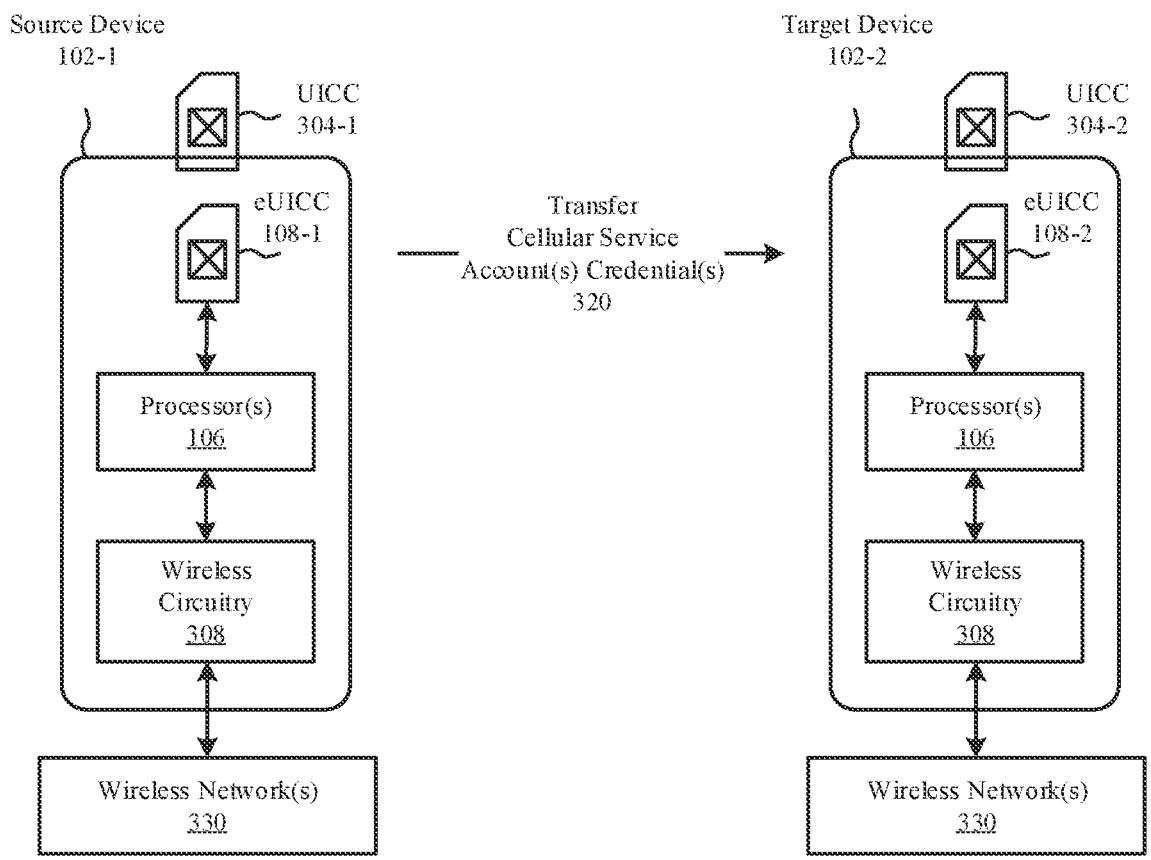
FIG. 3 illustrates a diagram of an exemplary transfer of cellular service account credentials for access to cellular services from a source device to a target device, according to some embodiments.

FIG. 3 illustrates a diagram 300 of an exemplary transfer 320 of cellular service account credentials for access to cellular services from a source device 102-1 to a target device 102-2. The source device 102-1 and the target device 102-2 may be within proximity of each other to establish a direct secure connection between them or may be separated by a distance where transfer occurs via an indirect connection, such as over a wireless local area network (WLAN) and/or via one or more cellular wireless networks 330. Transfer of credentials that permit access to services of cellular wireless networks 330 can also be referred to as transfer of one or more virtual credentials, such as one or more eSIMs 208, also referred to as profiles or plans, from the source device 102-1 to the target device 102-2. The eSIMs 208 may be initially present on the eUICC 108-1 of the source device 102-1, and a user may seek to transfer one or more of the eSIMs 208 from the source device 102-1 to the eUICC 108-2 of the target device 102-2. The eSIMs 208 may be associated with one or more cellular service accounts for one or more cellular service providers, also referred to as mobile network operators (MNOs). Transfer of one or more eSIMs 208 can occur without transferring a UICC 304-2 of the source device 102-1 or replacement of a UICC 304-2 of the target device 1-202. As illustrated, the source device 102-1 and the target device 102-2 can each include one or more processors 104 and wireless circuitry 308 that can be used to communicate with one or more wireless networks 330. The eSIMs 208 that are transferred can allow the target device 102-2 to access cellular services for one or more cellular wireless networks that previously were accessible by the source device 102-1.

Figure 4:
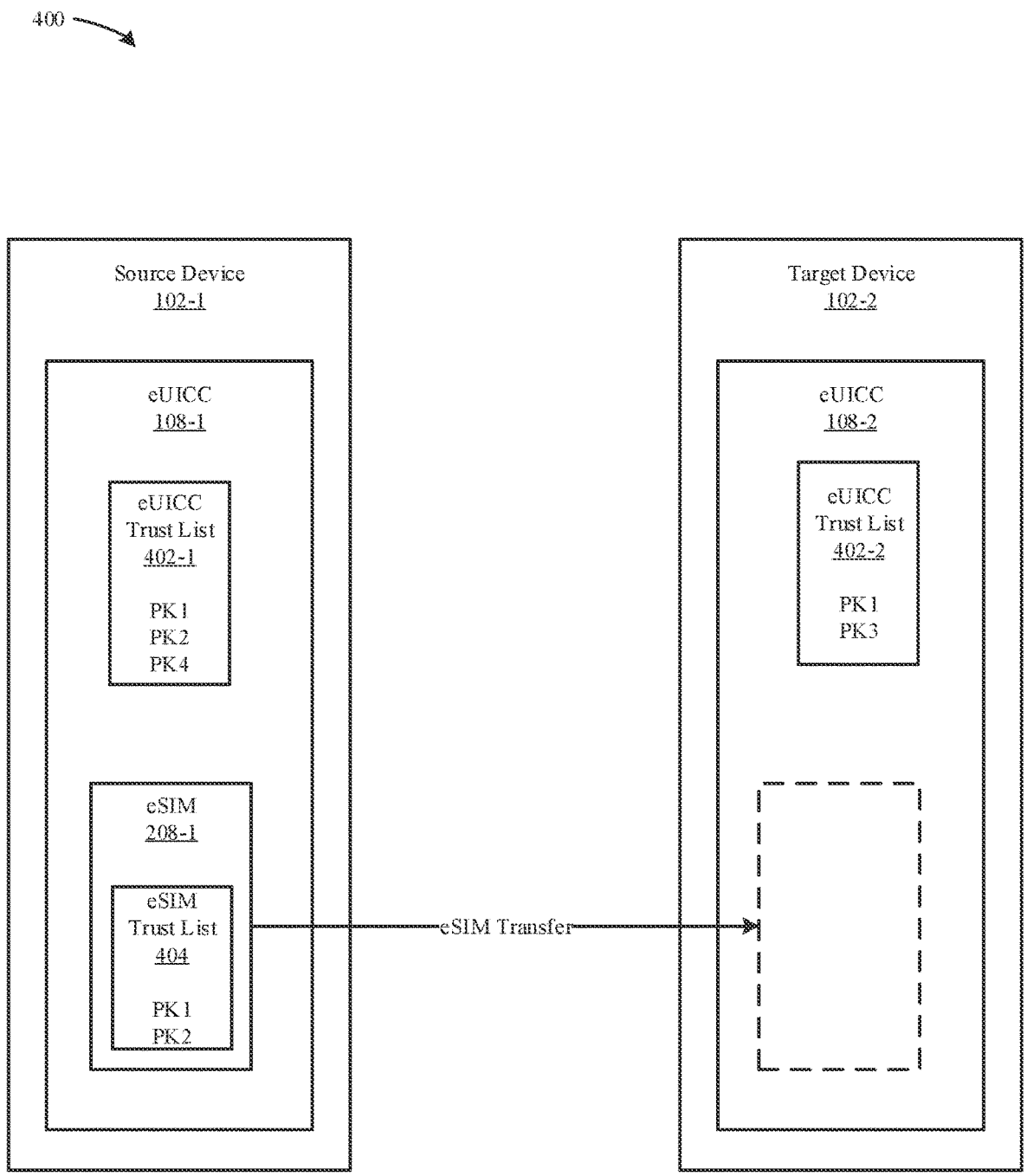
FIG. 4 illustrates a diagram of an exemplary potential transfer of an eSIM from a source device to a target device based on a trust configuration, according to some embodiments.

FIG. 4 illustrates a diagram 400 of an exemplary potential transfer of an eSIM 208-1 from a source device 102-1 to a target device 102-2 based on: i) a trust configuration for the eUICC 108-2 of the target device 102-2 that seeks to receive the eSIM 208-1 from the eUICC 108-1 of the source device 102-1, ii) a trust configuration for the eUICC 108-1 of the source device 102-1 on which the eSIM 208-1 currently resides, and/or iii) a trust configuration of the eSIM 208-1 to be transferred. A trust configuration can restrict certain eSIM management operations, such as importing, exporting, modifying, enabling, disabling, transferring, etc., for the eSIM 208-1 to one or more roots of trust. At the source device 102-1, a trust configuration of the eUICC 108-1 can restrict transferal of the eSIM 208-1 to an eUICC 108 of a target device 102 that has an appropriate trust configuration (and therefore can be trusted with the eSIM 208-1). A trust configuration can be for an eUICC 108 and/or for a particular eSIM 208 on the eUICC 108. At the target device 102-2, a trust configuration of the eUICC 108-2 can restrict transferal of eSIMs to only those from an eUICC 108 of a source device 102-1 that has an appropriate trust configuration, e.g., from a verifiable, trusted source device 102-1. Additionally, and/or alternatively, a source device 102-1 can seek to ensure that the eSIM 208-1 is only transferred to a trusted target device 102-2 on which the eUICC 108-2 is appropriately configured for use of the eSIM 208-1. Similarly, a target device 102-2 can seek to ensure that the eSIM 208-1 is only transferred from a trusted source device 102-1. A trust configuration can be based on a white list of roots of trust, e.g., enumerated by a set of certificates and/or public keys included in/with certificates obtained from trusted entities. A trust configuration can also be based on a black list of denigrated roots of trust, e.g., a certificate revocation list (CRL). Representative roots of trust can include certificates (and/or associated public keys) from one or more specific network entities illustrated in FIG. 1C, such as from an EUM 158, a CA 164, a subCA 166, an SM-DP+ 154, an SM-DS 160, and/or a DLOA registrar 162. In some embodiments, an eSIM 208, e.g., eSIM 208-1, includes its own eSIM trust list 404 that indicates one or more roots of trust, at least one of which an eUICC 108 must possess for the eSIM 208 to be resident on the eUICC 108. As illustrated in FIG. 4, the eSIM 208-1 includes an eSIM trust list 404 indicating two roots of trust, one based on a first certificate associated with a first public key (PK1), and another based on a second certificate associated with a second public key (PK2). The eUICC 108-1 of the source device 102-1 includes eUICC trust list 402-1 that indicates three roots of trust based on three certificates associated with three different public keys, namely PK1, PK2, and PK4. As there is an overlap of at least one of the roots of trust between the eSIM 208-1 and the eUICC 108-1, the eSIM 208-1 has been previously installed and resides on the eUICC 108-1 of the source device 102-1. To determine whether the eUICC 108-2 of the target device 102-2 has a trust configuration that allows for transferal of the eSIM 208-1, the source device 102-1 can ascertain whether the eUICC trust list 402-2 of the eUICC 108-2 of the target device 102-2 includes at least one root of trust that is valid for the eSIM 208-1. As illustrated in FIG. 4, the eUICC trust list 402-2 of the target device 102-2 indicates two roots of trust based on two certificates associated with two different public keys, namely PK1 and PK3. As there is one overlapping root of trust, namely PK1, the eUICC 108-2 of the target device 102-2 may be eligible to receive transferal of the eSIM 208-1 from the source device 102-1. In some embodiments, the source device 102-1 and/or the target device 102-2 obtain, from one or more network-based servers, an eligibility attestation result that attests to whether the eSIM 208-1 can be transferred to the eUICC 108-2 of the target device 102-2.

Figure 5:
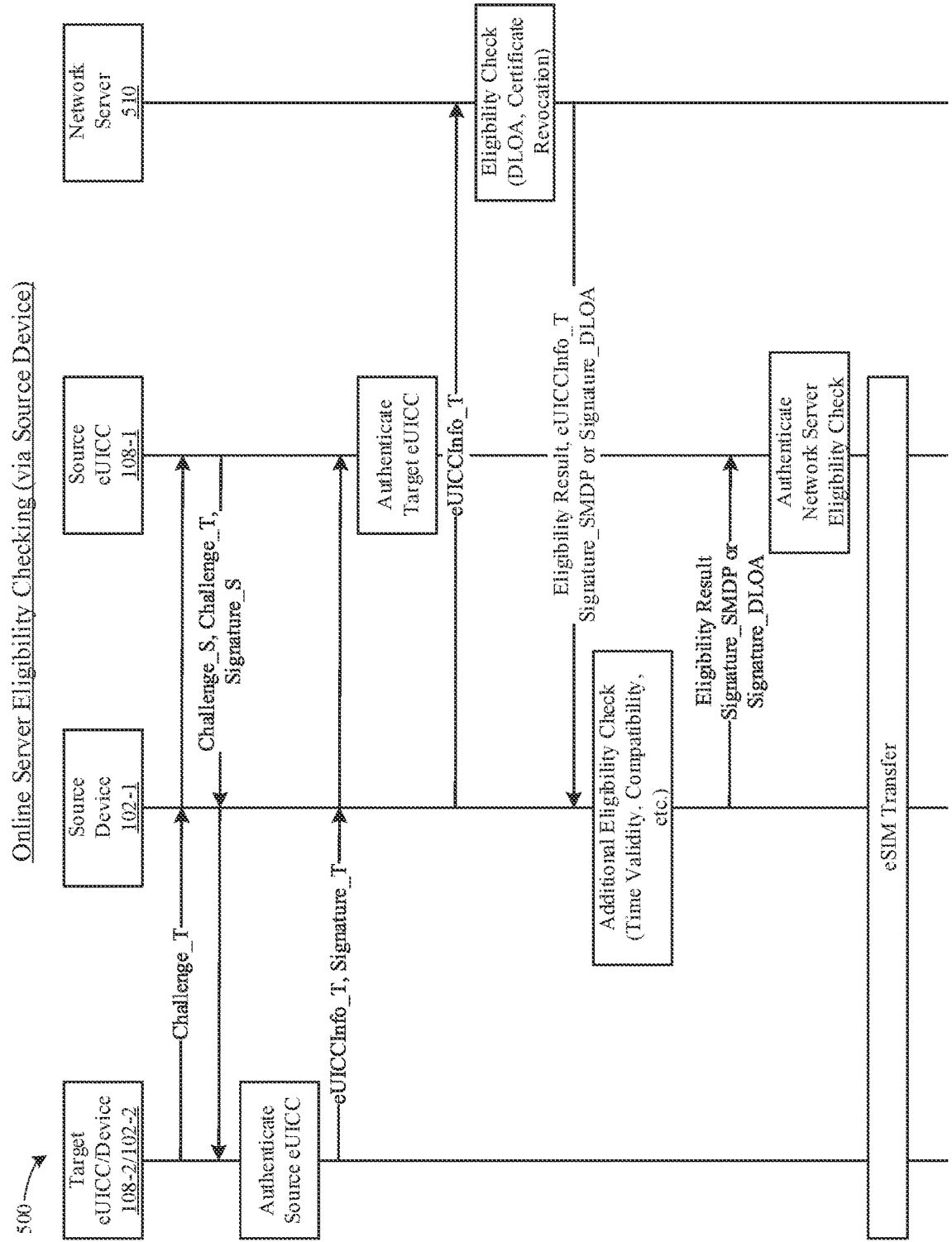
FIGS. 5-8 illustrate flow charts of exemplary eligibility checking procedures for transfer of an eSIM from a source device to a target device based on communication with one or more network servers, according to some embodiments.

FIG. 5 illustrates a flow chart 500 of an exemplary eligibility checking procedure for transfer of an eSIM 208 from a source device 102-1 to a target device 102-2 based on communication with one or more network servers 510. Initially, the target device 102-2 and source device 102-1 perform a mutual authentication procedure. The target device eUICC 108-2 communicates to the source device eUICC 108-1 a challenge (Challenge_T), via the target device 102-2 and source device 102-1. The source device eUICC 108-1 responds to the challenge with its own challenge (Challenge_S) returning the received challenge (Challenge_T) accompanied by a signature (Signature_S) generated by the source device eUICC 108-1, e.g., based on an eUICC certificate. The target device eUICC 108-2 authenticates the source device eUICC 108-1 based on the signature, and upon successful authentication of the source device eUICC 108-1 replies, to the source device eUICC 108-1, with eUICC trust configuration information (eUICCInfo_T) for the target device eUICC 108-2 accompanied by a signature (Signature_T) generated by the target device eUICC 108-2, e.g., based on its own eUICC certificate. The source device eUICC 108-1 authenticates the target device eUICC 108-2 based on the received signature, and upon successful authentication indicates to the source device 102-1 to forward the eUICC trust configuration information (eUICCInfo_T) from the target device eUICC 108-2 to a network server 510 to determine whether a trust configuration of the target device eUICC 108-2 is eligible for transfer of one or more eSIMs 208 from the source device eUICC 108-1. In some embodiments, the network server 510 can be an SM-DP+ 154 or a DLOA registrar 162. The network server 510 performs an eSIM transfer eligibility check for the target device eUICC 108-2 and returns, to the source device 102-1, an eligibility attestation result (Eligibility Result) that attests to whether the target device eUICC 108-2 has an appropriate configuration for receiving transferal of one or more eSIMs 208. The eligibility result can be accompanied by the eUICC trust configuration information (eUICCInfo_T) and a signature from the network server (e.g., Signature_SMDP or Signature_DLOA). The source device 102-1, in some embodiments, can perform an additional eligibility check for transfer of one or more eSIMs 208, e.g., based on determination of a validity time period for the eligibility result or based on other compatibility requirements. The source device 102-1 can forward the eligibility result accompanied by the received signature to the source device eUICC 108-1, which can authenticate the eligibility result obtained from the network server 510. Upon successful authentication of the eligibility result, the source device eUICC 108-1 can initiate transfer of one or more eSIMs to the target device eUICC 108-2 of the target device 102-2. In some embodiments, the source device eUICC 108-1 and/or an eSIM 208 to be transferred from the source device eUICC 108-1 can be configured with a designated, trusted network server 510 (or its trusted root), e.g., a particular SM-DP+ 154 and/or a particular DLOA registrar 162. In some embodiments, the target device eUICC 108-2 can be configured with a designated, trusted network server 510 (or its trusted root) with which the source device 102-1 can seek an eligibility result for transfer of one or more eSIMs. The network server 510 can provide a server attestation about whether the target device eUICC 108-2 is eligible for transfer of one or more eSIMs 208.

Figure 6:
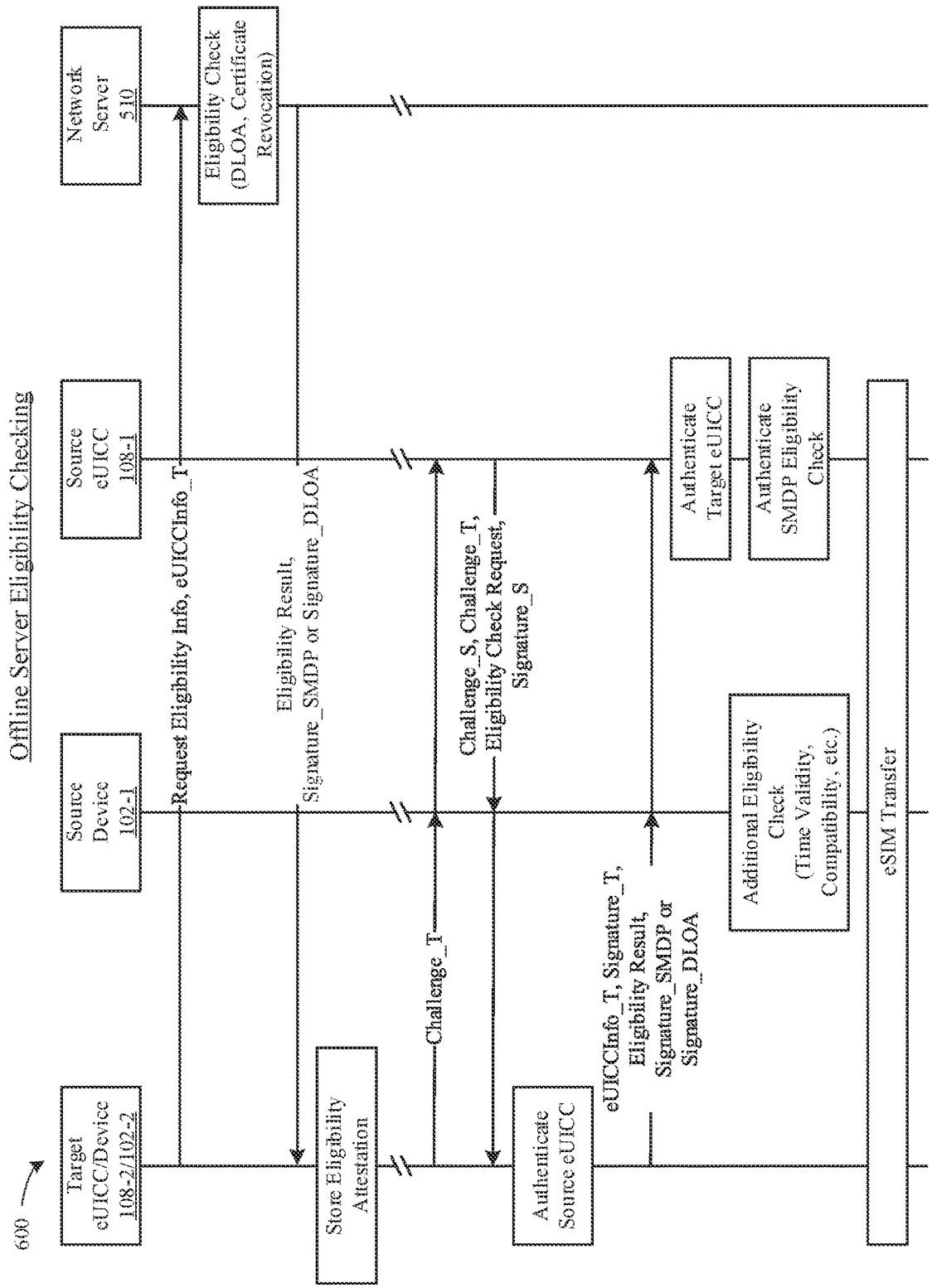

FIG. 6 illustrates a flow chart 600 of another exemplary eligibility checking procedure for transfer of an eSIM 208 from a source device 102-1 to a target device 102-2 based on communication with one or more network servers 510. The procedure illustrated in FIG. 5 includes determining eligibility for eSIM transfer by the network server 510 during an eSIM transfer. The procedure illustrated in FIG. 6 allows for determining eligibility for eSIM transfer by the network server 510 in advance of the eSIM transfer. Thus, a target device eUICC 108-2 can obtain an eSIM transfer eligibility result and later use that eligibility result during a subsequent eSIM transfer procedure, without requiring communication with the network server 510 to obtain the eligibility result during the eSIM transfer procedure. The target device eUICC 108-2 can send a message to a network server 510, e.g., SM-DP+ 154 and/or DLOA registrar 162, the message including a request for eSIM transfer eligibility and also including eUICC trust configuration information (eUICCInfo_T). In some embodiments, the target device eUICC 108-2 can be configured with a designated, trusted network server 510 (or its trusted root) with which the source device eUICC 108-2 (and/or source device 102-1) can seek an eligibility result for transfer of one or more eSIMs 208. The network server 510 performs an eSIM transfer eligibility check for the target device eUICC 108-2 and returns, to the target device 102-1, an eligibility result (Eligibility Result) that attests to whether the target device eUICC 108-2 has an appropriate configuration for receiving transferal of one or more eSIMs 208. The eligibility result can be accompanied by a signature from the network server (e.g., Signature_SMDP or Signature_DLOA). The target device 102-2 (and/or the target device eUICC 108-2) can store the eligibility result (attestation) from the network server 510 for future use. In some embodiments, the eligibility result includes an indication of a time period of validity for the eligibility result.

At a subsequent time, the target device eUICC 108-2 can seek to transfer one or more eSIMs 208 from a source device eUICC 108-1. The target device 102-2 and source device 102-1 perform a mutual authentication procedure. The target device eUICC 108-2 communicates to the source device eUICC 108-1 a challenge (Challenge_T), via the target device 102-2 and source device 102-1. The source device eUICC 108-1 responds to the challenge with its own challenge (Challenge_S) returning the received challenge (Challenge_T) accompanied by a signature (Signature_S) generated by the source device eUICC 108-1, e.g., based on an eUICC certificate. The source device eUICC 108-1 can also include a request for information regarding eSIM transfer eligibility for the target device eUICC 108-2. The target device eUICC 108-2 authenticates the source device eUICC 108-1 based on the signature, and upon successful authentication of the source device eUICC 108-1 replies, to the source device eUICC 108-1, with eUICC trust configuration information (eUICCInfo_T) for the target device eUICC 108-2 accompanied by a signature (Signature_T) generated by the target device eUICC 108-2, e.g., based on its own eUICC certificate as well as a previously obtained eSIM transfer eligibility result (attestation) accompanied by a signature from the applicable network server 510 (e.g., Signature_SMDP or Signature_DLOA). The source device eUICC 108-1 authenticates the target device eUICC 108-2 based on the received signature, and upon successful authentication, the source device eUICC 108-1 can authenticate the eligibility result provided by the target device eUICC 108-2. The source device 102-1, in some embodiments, can perform an additional eligibility check for transfer of one or more eSIMs 208, e.g., based on determination of a validity time period for the eligibility result or based on other compatibility requirements Upon successful authentication of the eligibility result, the source device eUICC 108-1 can initiate transfer of one or more eSIMs to the target device eUICC 108-2 of the target device 102-2. As with FIG. 5, the target device eUICC 108-2, the source device eUICC 108-1, and/or an eSIM 208 to be transferred from the source device eUICC 108-1 can be configured with a designated, trusted network server 510 (or its trusted root), e.g., a particular SM-DP+ 154 and/or a particular DLOA registrar 162 with which to communicate regarding eSIM transfer eligibility.

Figure 7:
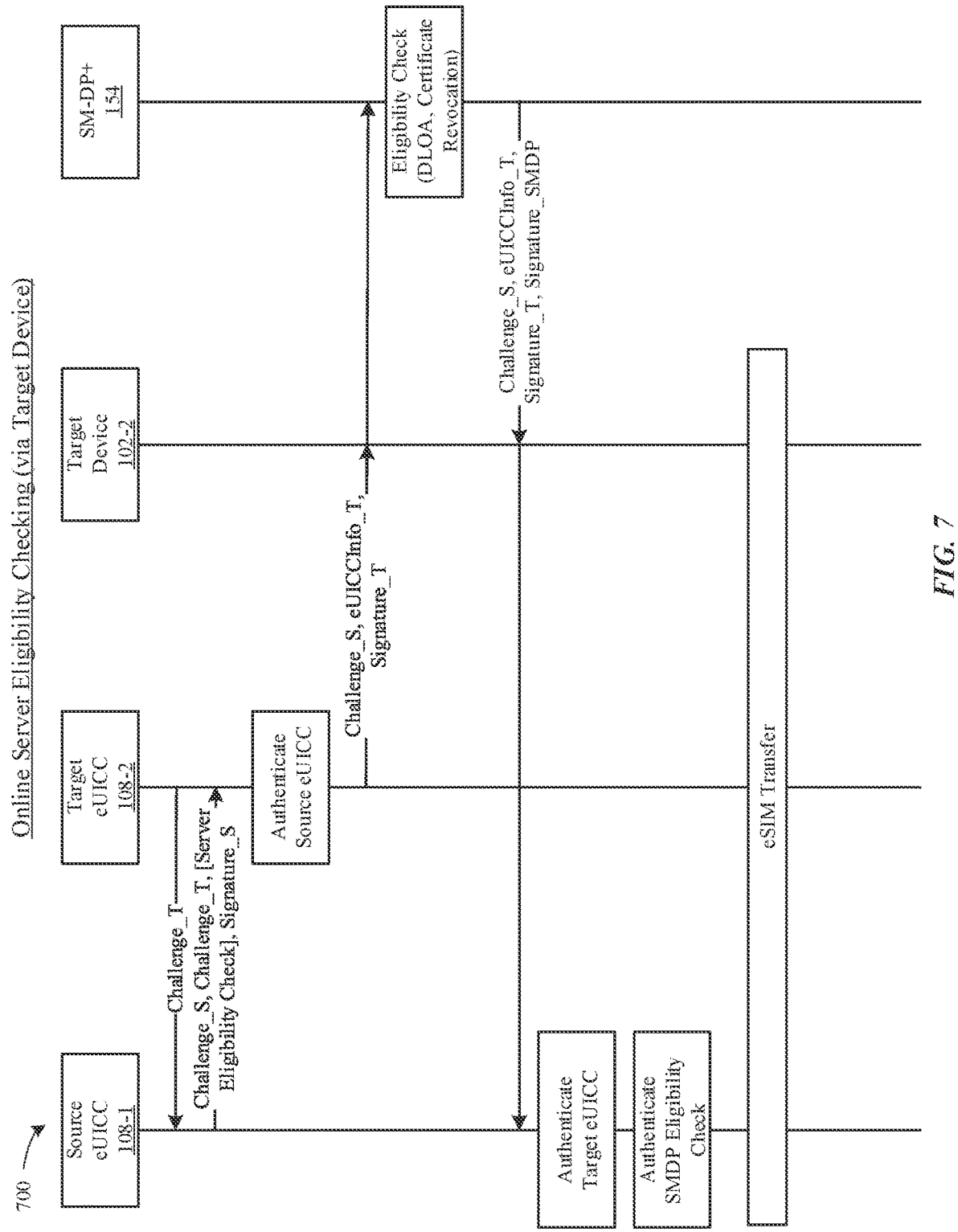

FIG. 7 illustrates a flow chart 700 of another exemplary eligibility checking procedure for transfer of an eSIM 208 from a source device 102-1 to a target device 102-2 based on communication with one or more network servers 510. In FIG. 7, the target device eUICC 108-2 obtains an eSIM transfer eligibility result (attestation) from a network server, e.g., SM-DP+ 154, during an eSIM transfer procedure. The target device eUICC 108-2 initiates a mutual authentication procedure by sending to the source device eUICC 108-1 a challenge (Challenge_T). The source device eUICC 108-1 responds to the challenge with its own challenge (Challenge_S) returning the received challenge (Challenge_T) accompanied by a signature (Signature_S) generated by the source device eUICC 108-1, e.g., based on an eUICC certificate. In some embodiments, the source device eUICC 108-1 includes a request for eSIM transfer eligibility checking from the target device eUICC 108-2. The target device eUICC 108-2 authenticates the source device eUICC 108-1 based on the signature, and upon successful authentication of the source device eUICC 108-1, the target device eUICC 108-2 sends the challenge from the source device eUICC 108-1 (Challenge_S) and eUICC trust configuration information (eUICCInfo_T) for the target device eUICC 108-2 accompanied by a signature (Signature_T) generated by the target device eUICC 108-2 to a network server, e.g., SM-DP+ 154, via the target device 102, to obtain an eSIM transfer eligibility result (attestation). The SM-DP+ 154 performs an eSIM transfer eligibility check for the target device eUICC 108-2 and returns, to the target device 102-2, the source device challenge (Challenge_S), the eUICC trust configuration information (eUICCInfo_T), the signature from the target device eUICC 108-2 (Signature_T) and a signature from the SM-DP+ 154 (Signature_SMDP). The target device 102-2 forwards to the source device eUICC 108-1 the source device challenge (Challenge_S), the eUICC trust configuration information (eUICCInfo_T), the signature from the target device eUICC 108-2 (Signature_T) and a signature from the SM-DP+ 154 (Signature_SMDP) received from the SM-DP+ 154. The source device eUICC 108-1 authenticates the target device eUICC 108-2 based on the received signature from the target device eUICC 108-2 (Signature_T). The source device eUICC 108-2 further authenticates the SM-DP+ 154 eligibility check based on the received signature from the SM-DP+ 154 (Signature_SMDP). Upon successful authentication, the source device eUICC 108-1 initiates transfer of one or more eSIMs to the target device eUICC 108-2. The source device eUICC 108-1 can use the target device eUICC information (eUICCInfo_T) to determine whether one or more eSIMs are compatible for transfer to the target device eUICC 108-2.

Figure 8:
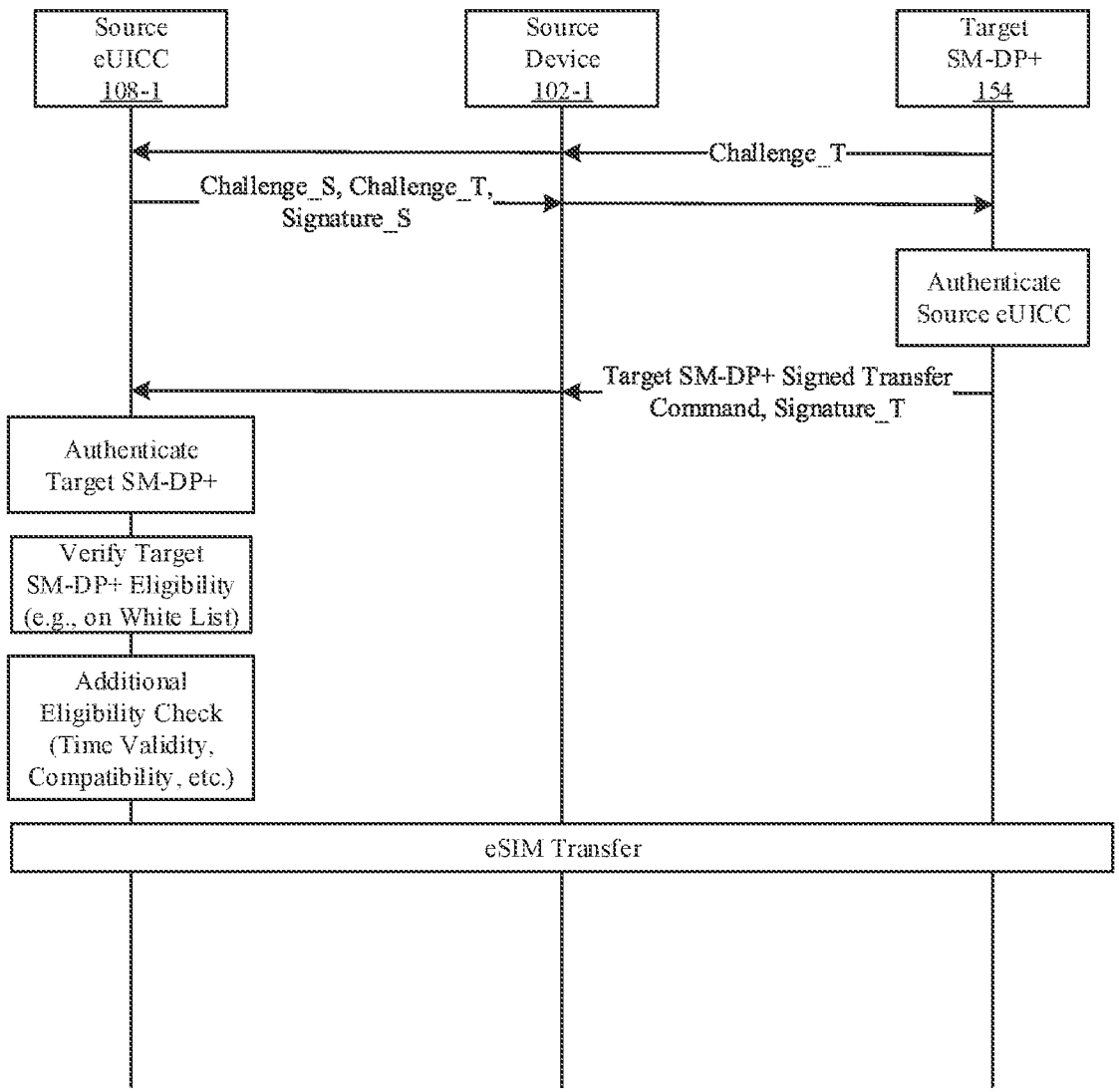

FIG. 8 illustrates a flow chart 800 of another eligibility checking procedure for transfer of an eSIM 208 from a source device 102-1 to a target SM-DP+ 154 with which a target device 102-2 is associated. The target SM-DP+ 154 initiates a mutual authentication procedure by sending to the source device eUICC 108-1 a challenge (Challenge_T). The source device eUICC 108-1 responds to the challenge with its own challenge (Challenge_S) returning the received challenge (Challenge_T) accompanied by a signature (Signature_S) generated by the source device eUICC 108-1, e.g., based on an eUICC certificate. The target SM-DP+ 154 authenticates the source device eUICC 108-1 based on the received signature (Signature_S). Upon successful authentication, the target SM-DP+ 154 sends an eSIM transfer (export) command signed by the target SM-DP+ accompanied by a signature (Signature_T). The source device eUICC 108-1 authenticates the target SM-DP+ 154, e.g., based on the signature (Signature_T) and verifies that the target SM-DP+ 154 is eligible for transfer of one or more eSIMs 208 from the source device eUICC 108-1. Eligibility can be determined based on compatibility of the target SM-DP+ with a trust configuration of the source device eUICC 108-1 (and/or a trust configuration of one or more eSIMs 208 on the source device eUICC 108-1). In some embodiments, the source device eUICC 108-1 determines whether the target SM-DP+ 154 is included in a white list or not included in a black list. In some embodiments, the source device eUICC 108-1 performs additional eligibility checking for transfer of one or more eSIMs 208 to the target SM-DP+ 154, e.g., based on a validity time period or based on other compatibility requirements. Upon successful authentication, verification, and validity for eligibility to transfer eSIMs to the target SM-DP+ 154, the source device eUICC 108-1 initiates transfer of one or more eSIMs to the target SM-DP+ 154. In some embodiments, an eSIM 208 includes trust configuration information regarding one or more trusted SM-DP+ 154 to which the eSIM 208 can be transferred. In some embodiments, the trust configuration information is included in a trusted certificate chain. In some embodiments, the eSIM 208 indicates that a particular SM-DP+ 154 from which the eSIM 208 was originally downloaded can be trusted for later transfer back.

Representative Embodiments

In some embodiments, a method for eSIM transfer eligibility checking includes a target device 102-2: i) providing, to a network server 510, a) a request for an eSIM transfer eligibility attestation and b) trust configuration information of an eUICC 108-2 of the target device 102-2; ii) obtaining, from the network server 510, an eSIM transfer eligibility attestation result and a network server generated signature; iii) receiving, from a source device 102-1, a request for eSIM transfer eligibility checking; iv) providing, to the source device 102-1, the eSIM transfer eligibility attestation result and the network server generated signature; and v) upon successful authentication of eSIM transfer eligibility, performing an eSIM transfer of one or more eSIMs 208 from an eUICC 108-1 of the source device 102-1 to the eUICC 108-2 of the target device 102-2.

In some embodiments, the network server 510 includes a subscription manager data preparation (SM-DP+) server 154. In some embodiments, the network server includes a digital letter of approval (DLOA) server 162. In some embodiments, the eSIM transfer eligibility attestation result includes an indication of a time period for which the transfer eligibility attestation result is valid. In some embodiments, the trust configuration information of the eUICC 108-2 of the target device 102-2 includes a white list of trusted entities and/or a black list of untrusted entities. In some embodiments, the eUICC 108-2 of the target device 102-2 includes one or more certificates and one or more public keys extracted from signed and verified certificates provided by one or more trusted entities included in the white list of trusted entities. In some embodiments, the authentication of eSIM transfer eligibility includes a determination by the source device 102-1 and/or by an eUICC 108-1 included in the source device 102-1 whether an eUICC certification configuration or a root of trust configuration of the target device 102-2 is compatible with the one or more eSIMs 208 to transfer from the eUICC 108-1 of the source device 102-1 to the eUICC 108-2 of the target device 102-2. In some embodiments, the successful authentication of eSIM transfer eligibility includes a determination that a trust configuration of the eUICC 108-2 of the target device 102-2 and a trust configuration of the one or more eSIMs 208 to be transferred includes at least one common root of trust.

In some embodiments, a method for eSIM transfer eligibility checking includes a source device 102-1: i) performing an authentication procedure with a target device 102-2; ii) obtaining, from the target device 102-2, trust configuration information of an eUICC 108-2 of the target device 102-2; iii) providing, to a network server 510, the trust configuration information of the eUICC 108-2 of the target device 102-2; iv) obtaining, from the network server 510, an eSIM transfer eligibility attestation result and a network generated signature; v) determining eSIM transfer eligibility for transfer of one or more eSIMs 208 from an eUICC 108-1 of the source device 102-1 to the eUICC 108-2 of the target device 102-2; and vi) upon successful authentication of eSIM transfer eligibility, performing an eSIM transfer of the one or more eSIMs 208 from the eUICC 108-1 of the source device 102-1 to the eUICC 108-2 of the target device 102-2.

In some embodiments, the network server 510 includes a subscription manager data preparation (SM-DP+) server 154. In some embodiments, the network server 510 includes a digital letter of approval (DLOA) server 162. In some embodiments, the eSIM transfer eligibility attestation result includes an indication of a time period for which the transfer eligibility attestation result is valid. In some embodiments, determining the eSIM transfer eligibility includes determining whether transfer of the one or more eSIMs 208 occurs within the time period for which the transfer eligibility attestation result is valid. In some embodiments, the trust configuration information of the eUICC 108-2 of the target device 102-2 includes a white list of trusted entities and/or a black list of untrusted entities. In some embodiments, the eUICC 108-2 of the target device 102-2 includes one or more certificates and one or more public keys extracted from signed and verified certificates provided by one or more trusted entities included in the white list of trusted entities. In some embodiments, the authentication of eSIM transfer eligibility includes a determination by the source device 102-1 and/or by the eUICC 108-2 of the source device 102-1 whether an eUICC certification configuration or a root of trust configuration of the target device 102-2 is compatible with the one or more eSIMs 208 to transfer from the eUICC 108-1 of the source device 102-1 to the eUICC 108-2 of the target device 102-2. In some embodiments, the successful authentication of eSIM transfer eligibility includes a determination that a trust configuration of the eUICC 108-2 of the target device 102-2 and a trust configuration of the one or more eSIMs 208 to be transferred includes at least one common root of trust.

In some embodiments, a method for eSIM transfer eligibility checking includes a network server 510: i) receiving, from a source device 102-1 or a target device 102-2, trust configuration information of an eUICC 108-2 of the target device 102-2; ii) performing an eSIM transfer eligibility check for the eUICC 108-2 of the target device 102-2 based on the trust configuration information; and iii) providing, to the source device 102-1 or the target device 102-2, an eSIM transfer eligibility attestation result that indicates whether the eUICC 108-2 of the target device 102-2 has an appropriate configuration for receiving transfer of one or more eSIMs 208.

In some embodiments, the network server 510 includes a subscription manager data preparation (SM-DP+) server 154 or a digital letter of approval (DLOA) server 162. In some embodiments, the eSIM transfer eligibility attestation result includes an indication of a time period for which the transfer eligibility attestation result is valid.

In some embodiments, an apparatus configured for eSIM transfer eligibility checking in a target device 102-2 includes one or more processors 104 communicatively coupled to a memory 106 storing instructions that, when executed by the one or more processors 104, cause the target device 102-2 to perform actions of a method as described herein.

In some embodiments, an apparatus configured for eSIM transfer eligibility checking in a source device 102-1 includes one or more processors 104 communicatively coupled to a memory 106 storing instructions that, when executed by the one or more processors 104, cause the source device 102-1 to perform actions of a method as described herein.

In some embodiments, an apparatus configured for eSIM transfer eligibility checking in a network server 510 includes one or more processors communicatively coupled to a memory storing instructions that, when executed by the one or more processors, cause the network server 510 to perform actions of a method as described herein.

In some embodiments, a source device 102-1 configured for eSIM transfer eligibility checking includes wireless circuitry 308 including one or more antennas and one or more processors 104 communicatively coupled to the wireless circuitry 308 and to a memory 106 storing instructions that, when executed by the one or more processors 104, cause the source device 102-1 to perform actions of a method as described herein.

In some embodiments, a target device 102-2 configured for eSIM transfer eligibility checking includes wireless circuitry 308 including one or more antennas and one or more processors 104 communicatively coupled to the wireless circuitry 308 and to a memory 106 storing instructions that, when executed by the one or more processors 104, cause the target device 102-2 to perform actions of a method as described herein.

In some embodiments, a network server 510 configured for eSIM transfer eligibility checking includes wireless circuitry including one or more antennas and one or more processors communicatively coupled to the wireless circuitry and to a memory storing instructions that, when executed by the one or more processors, cause the network server 510 to perform actions of a method as described herein.

In some embodiments, a system configured for eSIM transfer eligibility checking includes a source device 102-1, a target device 102-2, and a network server 510 each configured to perform respective actions of a method as described herein.

Representative Exemplary Apparatus

Figure 9:
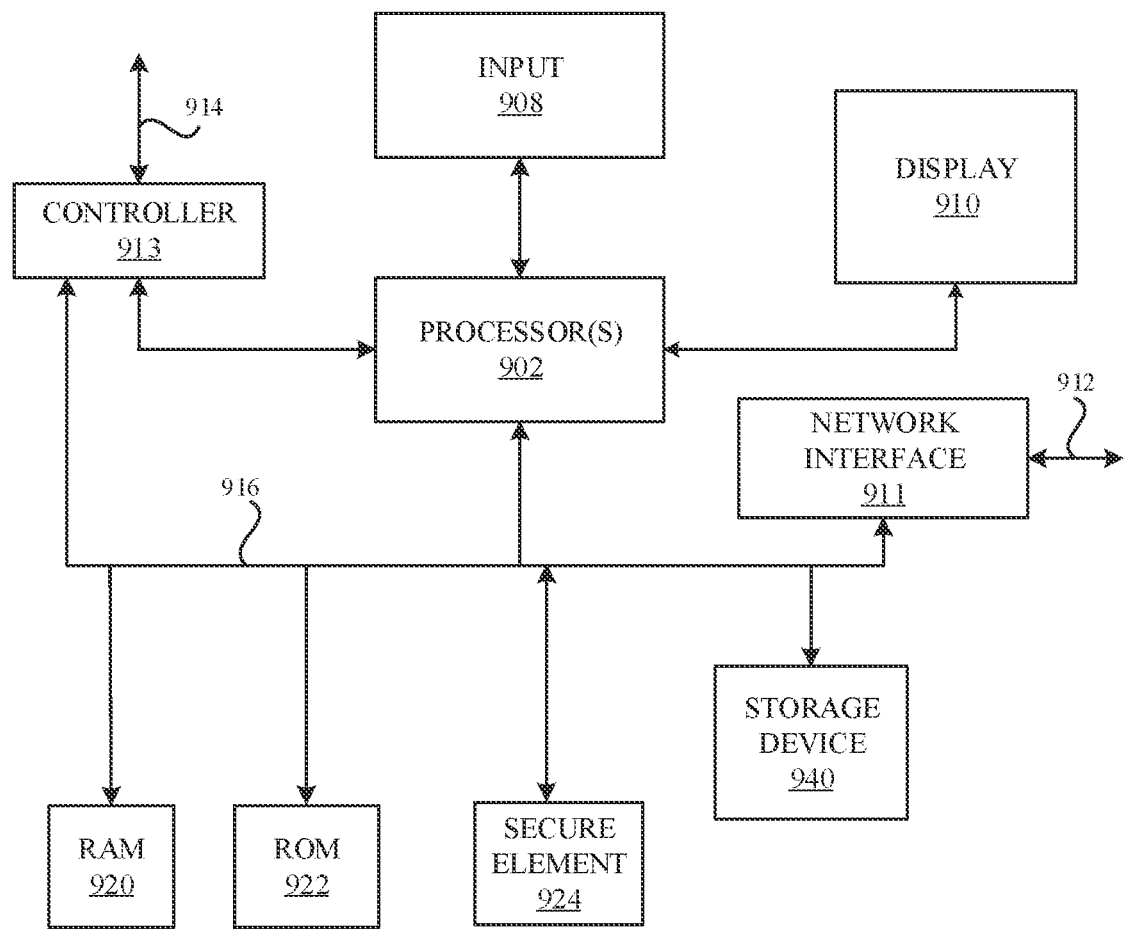
FIG. 9 illustrates a block diagram of exemplary elements of a mobile wireless device, according to some embodiments.

FIG. 9 illustrates in block diagram format an exemplary computing device 900 that can be used to implement the various components and techniques described herein, according to some embodiments. In particular, the detailed view of the exemplary computing device 900 illustrates various components that can be included in the source device 102-1 and/or the target device 102-2. As shown in FIG. 9, the computing device 900 can include one or more processors 902 that represent microprocessors or controllers for controlling the overall operation of computing device 900. In some embodiments, the computing device 900 can also include a user input device 908 that allows a user of the computing device 900 to interact with the computing device 900. For example, in some embodiments, the user input device 908 can take a variety of forms, such as a button, keypad, dial, touch screen, audio input interface, visual/image capture input interface, input in the form of sensor data, etc. In some embodiments, the computing device 900 can include a display 910 (screen display) that can be controlled by the processor(s) 902 to display information to the user (for example, information relating to incoming, outgoing, or active communication sessions). A data bus 916 can facilitate data transfer between at least a storage device 940, the processor(s) 902, and a controller 913. The controller 913 can be used to interface with and control different equipment through an equipment control bus 914. The computing device 900 can also include a network/bus interface 911 that couples to a data link 912. In the case of a wireless connection, the network/bus interface 911 can include wireless circuitry, such as a wireless transceiver and/or baseband processor. The computing device 900 can also include a secure element 924. The secure element 924 can include an eUICC 108.

The computing device 900 also includes a storage device 940, which can include a single storage or a plurality of storages (e.g., hard drives), and includes a storage management module that manages one or more partitions within the storage device 940. In some embodiments, storage device 940 can include flash memory, semiconductor (solid state) memory or the like. The computing device 900 can also include a Random-Access Memory (RAM) 920 and a Read-Only Memory (ROM) 922. The ROM 922 can store programs, utilities or processes to be executed in a non-volatile manner. The RAM 920 can provide volatile data storage, and stores instructions related to the operation of the computing device 900.

Wireless Terminology

In accordance with various embodiments described herein, the terms "wireless communication device," "wireless device," "mobile device," "mobile station," and "user equipment" (UE) may be used interchangeably herein to describe one or more common consumer electronic devices that may be capable of performing procedures associated with various embodiments of the disclosure. In accordance with various implementations, any one of these consumer electronic devices may relate to: a cellular phone or a smart phone, a tablet computer, a laptop computer, a notebook computer, a personal computer, a netbook computer, a media player device, an electronic book device, a MiFi® device, a wearable computing device, as well as any other type of electronic computing device having wireless communication capability that can include communication via one or more wireless communication protocols such as used for communication on: a wireless wide area network (WWAN), a wireless metro area network (WMAN) a wireless local area network (WLAN), a wireless personal area network (WPAN), a near field communication (NFC), a cellular wireless network, a fourth generation (4G) LTE, LTE Advanced (LTE-A), and/or 5G or other present or future developed advanced cellular wireless networks.

The wireless communication device, in some embodiments, can also operate as part of a wireless communication system, which can include a set of client devices, which can also be referred to as stations, client wireless devices, or client wireless communication devices, interconnected to an access point (AP), e.g., as part of a WLAN, and/or to each other, e.g., as part of a WPAN and/or an "ad hoc" wireless network. In some embodiments, the client device can be any wireless communication device that is capable of communicating via a WLAN technology, e.g., in accordance with a wireless local area network communication protocol. In some embodiments, the WLAN technology can include a Wi-Fi (or more generically a WLAN) wireless communication subsystem or radio, the Wi-Fi radio can implement an Institute of Electrical and Electronics Engineers (IEEE) 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; or other present or future developed IEEE 802.11 technologies.

Additionally, it should be understood that the UEs described herein may be configured as multi-mode wireless communication devices that are also capable of communicating via different third generation (3G) and/or second generation (2G) RATs. In these scenarios, a multi-mode user equipment (UE) can be configured to prefer attachment to LTE networks offering faster data rate throughput, as compared to other 3G legacy networks offering lower data rate throughputs. For instance, in some implementations, a multi-mode UE may be configured to fall back to a 3G legacy network, e.g., an Evolved High Speed Packet Access (HSPA+) network or a Code Division Multiple Access (CDMA) 2000 Evolution-Data Only (EV-DO) network, when LTE and LTE-A networks are otherwise unavailable.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a non-transitory computer readable medium. The non-transitory computer readable medium is any data storage device that can store data which can thereafter be read by a computer system. Examples of the non-transitory computer readable medium include read-only memory, random-access memory, CD-ROMs, HDDs, DVDs, magnetic tape, and optical data storage devices. The non-transitory computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A target device configured for electronic subscriber identity module (eSIM) transfer eligibility checking, the target device comprising:
   wireless circuitry comprising one or more antennas; and
   one or more processors communicatively coupled to the wireless circuitry and to a memory storing instructions that, when executed by the one or more processors, configure the target device to perform actions that include:
      receiving, from a source device, a request for eSIM transfer eligibility checking during an authentication procedure with the source device;
      providing, to a network server, trust configuration information of an embedded Universal Integrated Circuit Card (eUICC) of the target device;
      receiving, from the network server, the trust configuration information of the eUICC of the target device and a network server generated signature;
      providing, to the source device, the trust configuration information of the eUICC of the target device and the network server generated signature; and
      upon successful authentication of eSIM transfer eligibility by the source device based on the network server generated signature, performing an eSIM transfer of one or more eSIMs from an eUICC of the source device to the eUICC of the target device.

2. The target device of claim 1, wherein the network server comprises a subscription manager data preparation (SM-DP+) server.

3. The target device of claim 1, wherein the network server comprises a digital letter of approval (DLOA) server.

4. The target device of claim 1, wherein the trust configuration information of the eUICC of the target device includes a white list of trusted entities and/or a black list of untrusted entities.

5. The target device of claim 4, wherein the eUICC of the target device includes one or more certificates and one or more public keys extracted from signed and verified certificates provided by one or more trusted entities included in the white list of trusted entities.

6. The target device of claim 1, wherein the authentication of eSIM transfer eligibility by the source device further includes a determination by the eUICC of the source device whether an eUICC certification configuration or a root of trust configuration of the target device is compatible with the one or more eSIMs to transfer from the eUICC of the source device to the eUICC of the target device.

7. The target device of claim 6, wherein the eUICC of the source device performs the determination based on the trust configuration information of the eUICC of the target device.

8. The target device of claim 1, wherein the successful authentication of eSIM transfer eligibility includes a determination that a trust configuration of the eUICC of the target device and a trust configuration of the one or more eSIMs to be transferred includes at least one common root of trust.

9. A source device configured for electronic subscriber identity module (eSIM) transfer eligibility checking, the source device comprising:
   wireless circuitry comprising one or more antennas; and
   one or more processors communicatively coupled to the wireless circuitry and to a memory storing instructions that, when executed by the one or more processors, configure the source device to perform actions that include:
      providing, to a target device, a request for eSIM transfer eligibility checking during an authentication procedure with the target device;
      obtaining, from the target device, trust configuration information of an embedded Universal Integrated Circuit Card (eUICC) of the target device and a network server generated signature generated by a network server for the target device responsive to receipt of the trust configuration information from the target device; and
      upon successful authentication of eSIM transfer eligibility based on the network server generated signature, performing an eSIM transfer of one or more eSIMs from the eUICC of the source device to the eUICC of the target device.

10. The source device of claim 9, wherein the network server comprises a subscription manager data preparation (SM-DP+) server.

11. The source device of claim 9, wherein the network server comprises a digital letter of approval (DLOA) server.

12. The source device of claim 9, wherein the trust configuration information of the eUICC of the target device includes a white list of trusted entities and/or a black list of untrusted entities.

13. The source device of claim 12, wherein the eUICC of the target device includes one or more certificates and one or more public keys extracted from signed and verified certificates provided by one or more trusted entities included in the white list of trusted entities.

14. The source device of claim 9, wherein the authentication of eSIM transfer eligibility includes a determination by the eUICC of the source device whether an eUICC certification configuration or a root of trust configuration of the target device is compatible with the one or more eSIMs to transfer from the eUICC of the source device to the eUICC of the target device.

15. The source device of claim 14, the eUICC of the source device performs the determination based on the trust configuration information of the eUICC of the target device.

16. The source device of claim 9, wherein the successful authentication of eSIM transfer eligibility includes a determination that a trust configuration of the eUICC of the target device and a trust configuration of the one or more eSIMs to be transferred includes at least one common root of trust.

17. A method for electronic subscriber identity module (eSIM) transfer eligibility checking by a target device, the method comprising:
by the target device:
receiving, from a source device, a request for eSIM transfer eligibility checking during an authentication procedure with the source device;
providing, to a network server, trust configuration information of an embedded Universal Integrated Circuit Card (eUICC) of the target device;
receiving, from the network server, the trust configuration information of the eUICC of the target device and a network server generated signature;
providing, to the source device, the trust configuration information of the eUICC of the target device and the network server generated signature; and
upon successful authentication of eSIM transfer eligibility by the source device based on the network server generated signature, performing an eSIM transfer of one or more eSIMs from an eUICC of the source device to the eUICC of the target device.

18. The method of claim 17, wherein the trust configuration information of the eUICC of the target device includes a white list of trusted entities and/or a black list of untrusted entities.

19. The method of claim 17, wherein the authentication of eSIM transfer eligibility by the source device further includes a determination by the eUICC of the source device whether an eUICC certification configuration or a root of trust configuration of the target device is compatible with the one or more eSIMs to transfer from the eUICC of the source device to the eUICC of the target device.

20. The method of claim 17, wherein the successful authentication of eSIM transfer eligibility includes a determination that a trust configuration of the eUICC of the target device and a trust configuration of the one or more eSIMs to be transferred includes at least one common root of trust.

* * * * *